United States Patent [19]

Wang

[11] Patent Number: 4,729,059
[45] Date of Patent: Mar. 1, 1988

[54] TELEPHONE CONNECTION BOX
[76] Inventor: Chen H. Wang, 4th Fl., 66, Fu-Hsing N. Road, Taipei, Taiwan
[21] Appl. No.: 896,333
[22] Filed: Aug. 14, 1986
[51] Int. Cl.⁴ .............................................. H01R 4/66
[52] U.S. Cl. ..................................... 361/356; 361/56; 361/426; 379/412; 439/709; 439/716
[58] Field of Search ............... 379/412, 429, 442, 451; 174/65 G; 339/126 R, 125 R, 44 M, 147 R, 36, 37, 198 J, 75 M; 361/333, 334, 426, 356, 422, 424, 390, 391, 344, 357, 331, 395, 56, 91; 439/709, 712, 715, 716, 718, 722

[56] References Cited
U.S. PATENT DOCUMENTS

| | | | |
|---|---|---|---|
| 4,488,008 | 12/1984 | Dellinger | 379/412 |
| 4,560,839 | 12/1985 | Dillard | 379/399 |
| 4,562,311 | 12/1985 | Dola | 379/412 |
| 4,575,169 | 3/1986 | Duplatre | 174/65 G |
| 4,624,514 | 11/1986 | Smith | 379/412 |

OTHER PUBLICATIONS
Keptel Inc., Publication, SNI 2200, Jun. 1984, pp. 1-3.

Primary Examiner—G. P. Tolin
Attorney, Agent, or Firm—Lowe, Price, LeBlanc, Becker & Shur

[57] ABSTRACT

A telephone connection box is provided which has an inner lid and an outer lid. The inner lid is slidably and hingedly mounted within the box so that when the lid is opened it can be slid out of the way to permit repairs. One or more inverted L-shaped connection bases are slidably mounted within the box as is a surge protector. A minor connection base is separated from the inverted L-shaped connection base by a dividing wall which provides a seat for the inner lid. A peripheral rubber gasket is provided so that when the outer lid is closed the box will be sealed.

3 Claims, 6 Drawing Figures

TELEPHONE CONNECTION BOX

BACKGROUND OF THE INVENTION

With deregulation of the telephone company and the advent of private ownership of individual telephones there was a requirement for a telephone connection box at the user end of the phone system. The user then would own the telephone and wiring to the box and the phone company would own the telephone line to the box. Both parties would share responsibility for the box. In the case of an interruption in service then it would be possible to test at the box to determine whether the problem was in the telephone line, or in the user's home.

However, the conventional telephone connection box is also subject to breakdown. Moreover, in the conventional box the connectors are all fastened and it is therefore difficult to replace wires inside the confined area of the conventional box. Therefore, a telephone connection box which is readily accessible is needed.

The characteristics of such a telephone connection box would include connectors which can be removed easily so that they need not be repaired within the constraints of the box. It also is necessary to provide a protective seal on the box which is effective to seal access to the box, but will not interfere with maintenance on the connectors therein.

SUMMARY OF THE INVENTION

This invention is a telephone connection box which provides for easy replacement of a unit connection base and is convenient to repair. The box includes a set of tracks for receiving the connection base which is in the shape of a inverted L and for slidably receiving the minor base. The different components are separated by a division wall. The search protector and inverted L shaped connection base are housed within an inside lid which has slidable hinges so that it may be opened and moved out of the way when it is necessary to repair such components. The outer lid and the inner lid also need not be removed from the box in order to repair the inner components, and therefore the chance of misplace then is eliminated.

DESCRIPTION OF THE PREFERRED EMBODIMENTS

Figure 1:
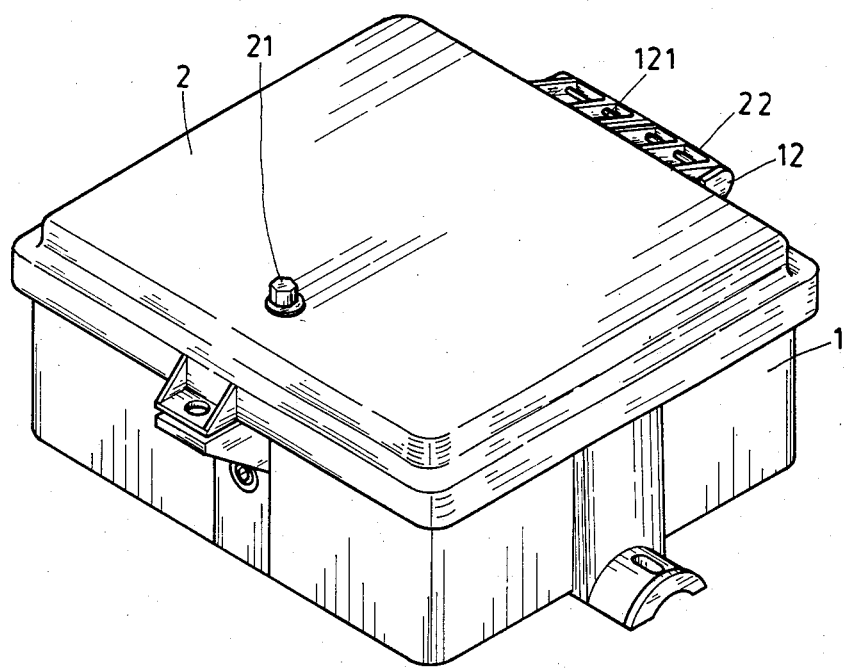
FIG. 1 is a perspective view of the telephone connection box of this invention.
Figure 2:
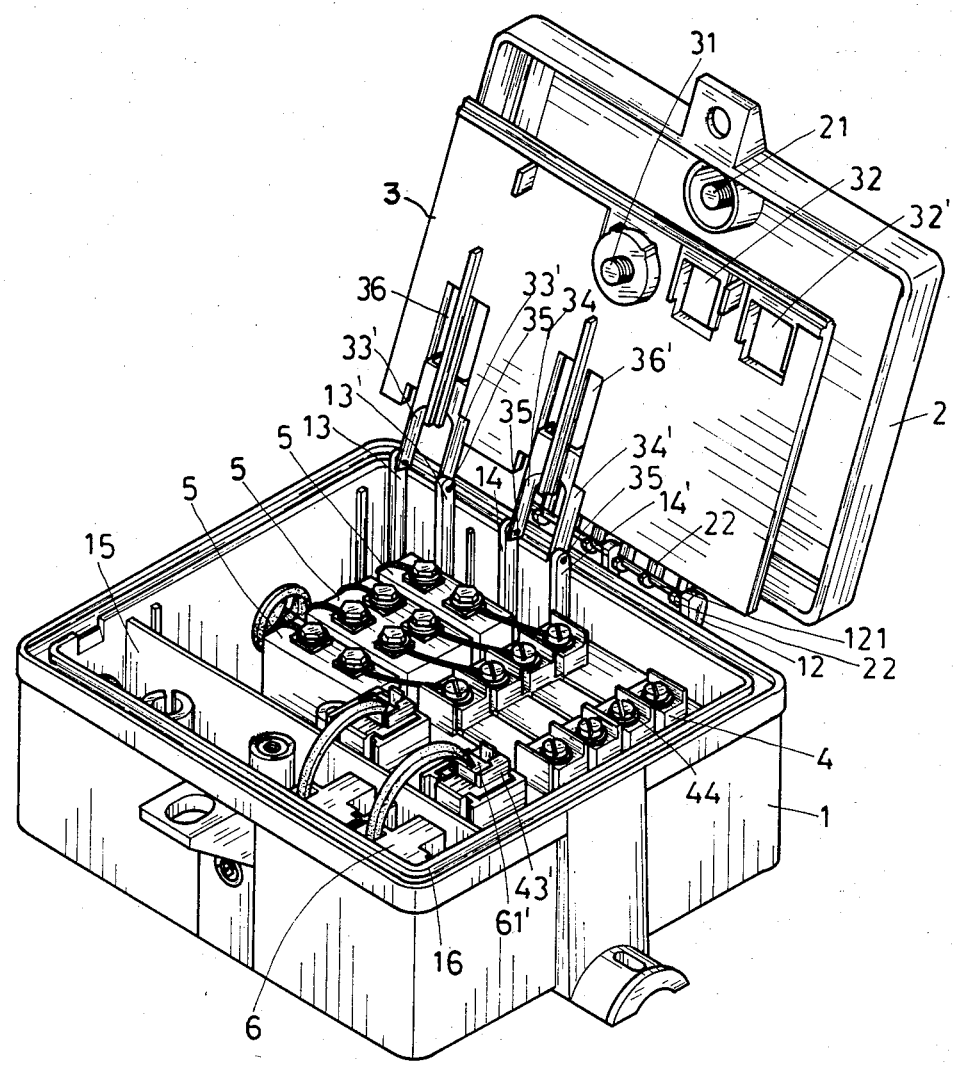
FIG. 2 is a perspective view of the telephone box of FIG. 1 with both lids in the open position.

With attention to FIGS. 1 and 2 the box 1 of this invention is equipped with holes 11 and 11' in a side thereof. The telephone line wire extends through hole 11 and the line to the user's telephone extends through hole 11'. An upper lid 2, equipped with a fastening screw 21, which provides a closure for the box 1. Lid 2 is hingedly attached to box 1 using U shaped sleeves 22 which are wedged onto hinge pin 121 which in turn is rotatably mounted on box 1 by fasteners 12.

Figure 5:
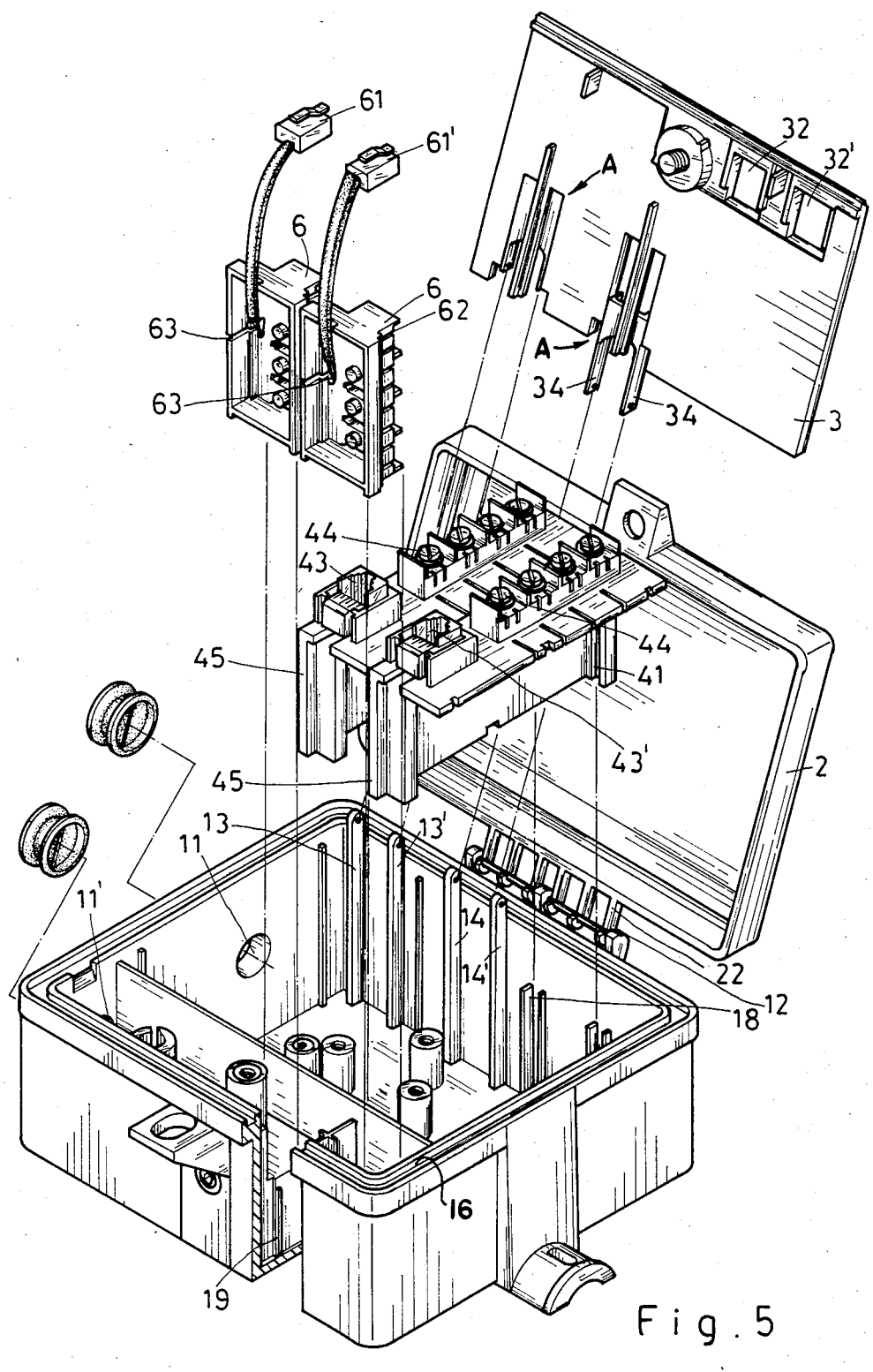
FIG. 5 is an exploded view of the device of this invention with the surge protector removed.

As shown in FIGS. 2 and 5 there is provided an inner lid 3 hingedly mounted within box 1 which is provided with a fastening screw 31. Inner lid 3 is provided with holes 32 and 32' so that plug inserts 61 and 61' may be inserted therethrough into bases 43 and 43'. The hinge connection for lid 3 includes members 13, 13' and 14, 14' which are mounted within box 1.

Figure 2A:
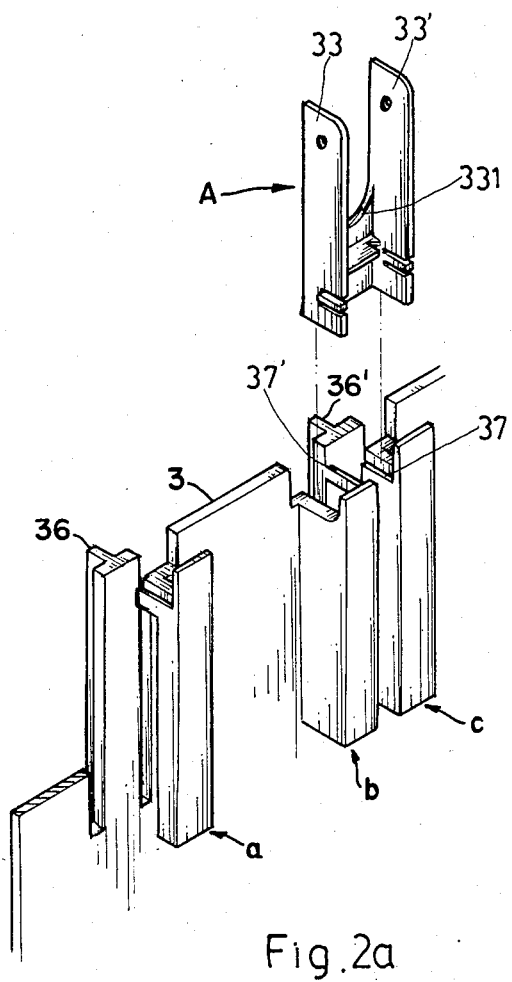
FIG. 2a is a fragmentary perspective view illustrating the inner lid sliding hinge.

Inner lid 3 is provided with two pairs of channels or tracks B and C as shown in FIG. 2A. Slide plates A having end portions 33 and 33' are received in channels B and C and are joined respectively to members 13 and 13' and 14 and 14' to form a hinged connection. Keeper members 36 are disposed over slide plates A and a stop 37 is provided for arched portion 331. The slide plates then are movable between the two positions shown in FIG. 5. When lid 3 is opened the slide plates may be extended so that the lid can be folded backwards out of the way to permit repairs or the extraction of inverted L-shaped connection base 4 for replacement.

As can be seen in FIG. 2, two inverted L-shaped connection bases 4 are slidably installed within box 1. The telephone input line connects through surge protector 5 to connection base 4. The number of surge protectors 5 and inverted L-shaped connection bases 4 within the box is matter of design and this invention is not intended to be limited to a specific number shown. Furthermore, surge protector 5 is a standard component and further details thereof are being omitted as obvious to one of ordinary skill in the art.

Minor connection base 6 also slidably mounted within box 1 is separated from the inverted L-shaped connection base 4 by a board 15. In this way a repair man may be able to easily distinguish between the two.

Figure 3:
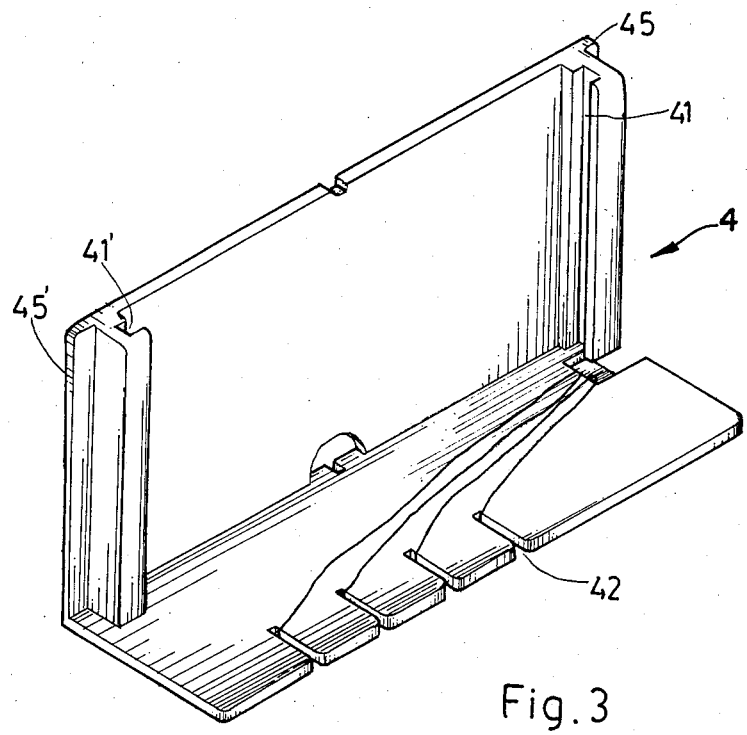
FIG. 3 is a perspective view of the L shaped connection base.

With attention to FIG. 3, the inverted L-shaped connection base 4 is provided with channels 41 and 41' so that a circuit board (not shown) may be inserted therewithin. There is a plurality of slits 42 also provided through which the telephone line wire extends to the line equipment base 44 and insertion base or socket 43 and 43'. The inverted L-shaped connection base 4 is also equipped with flanges 45 and 45' which are slidably received within grooves 18 within box 1.

Figure 4:
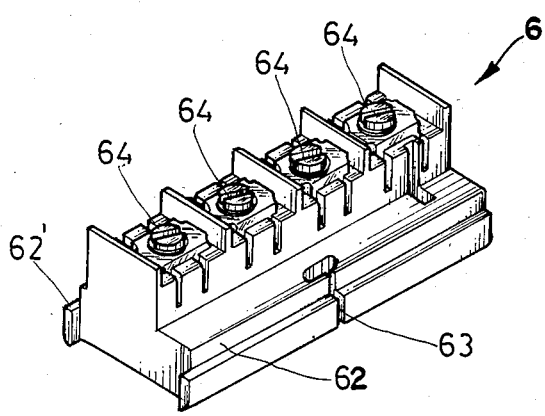
FIG. 4 is a perspective view of the minor connection base.

FIG. 4 shows the minor base 6. Flanges 62 and 62' are provided for mounting and a channel 63 is provided for the wire so that plug 61 and 61' may be received in sockets 43 and 43'.

With attention to FIG. 5 there is shown an exploded view of the connection box of this invention. A peripheral groove 16 is provided for a rubber gasket (not shown) so that when the lid 2 is closed the box will be sealed.

The inverted L-shaped connection base 4 is inserted and fastened within the frame box 1 in tracks 18 and the minor connection base 6 is inserted in track 19. The surge protector 5 is also fastened within the box 1 so tthat the input line extends from the inverted L-shaped connection base 4 to the minor connection base 6 through the surge protector 5.

I claim:

1. A telephone connection box comprising:
   a box frame having an outer lid hingedly connected thereto, sidewalls and a bottom wall, seal means surrounding the upper edge of said frame for sealing the connection between the lid and frame when the lid is in a closed position;

an inner lid disposed within said frame and slidably and pivotally mounted at an edge thereof to the upper portion of a side wall, said inner lid adapted to pivot from a closed position about 180° to an open position;

a divider wall extending across the interior of said frame and disposed so that when the inner lid is in a closed position an edge thereof seats on the upper surface of said wall;

at least one inverted L-shaped connection based slidably mounted within said box on one side of said wall;

at least one minor connection base slidably mounted within said box on an opposite side of said wall; and at least one surge protector mounted within said box and coupled between said L-shaped connection base and said minor connection base.

2. The box of claim 1 wherein a plurality of tracks are provided within said box integral with the side walls and flanges are provided on said bases for riding in said tracks to slidably and removably mount said bases in said box.

3. The box of claim 1 further comprising two pairs of channels formed in said inner lid at an edge therof; a pair of slide plates each having a pair of track members slidably received in a pair of said channels; hinge means pivotably attaching an end of each plate to an inner wall of said box for permitting pivotal movement of said lid between an open and a closed position.

* * * * *